United States Patent
Mallaci et al.

(10) Patent No.: US 7,806,697 B2
(45) Date of Patent: Oct. 5, 2010

(54) METHOD AND APPARATUS FOR DAMPING VIBRATIONS IN A MOTION SIMULATION PLATFORM

(75) Inventors: Giuseppe Mallaci, Beaconsfield (CA); Rémy Oddo, Rock-Forest (CA)

(73) Assignee: CAE Inc., Saint-Laurent (CA)

( * ) Notice: Subject to any disclaimer, the term of this patent is extended or adjusted under 35 U.S.C. 154(b) by 472 days.

(21) Appl. No.: 11/203,122

(22) Filed: Aug. 15, 2005

(65) Prior Publication Data

US 2007/0059668 A1 Mar. 15, 2007

(51) Int. Cl.
G09B 9/02 (2006.01)

(52) U.S. Cl. .............................. 434/372; 434/29; 434/46

(58) Field of Classification Search ................. 68/23.1; 74/437.29; 82/163; 174/42; 180/381; 188/73.35–37; 434/29, 365; 472/59; 267/136; 248/632, 248/634
See application file for complete search history.

(56) References Cited

U.S. PATENT DOCUMENTS

| | | | |
|---|---|---|---|
| 3,204,913 A | | 9/1965 | Lawrence et al. |
| RE27,051 E | | 2/1971 | Cappel |
| 3,577,659 A | | 5/1971 | Kail |
| 3,967,387 A | * | 7/1976 | Marchegiani ................ 434/58 |
| 3,984,924 A | | 10/1976 | Myles et al. |
| 4,377,218 A | * | 3/1983 | Fukushima ................ 180/300 |
| 4,753,596 A | | 6/1988 | Hart et al. |
| 5,366,375 A | | 11/1994 | Samicola |
| 5,551,661 A | * | 9/1996 | Bunker ....................... 248/634 |
| 5,605,462 A | | 2/1997 | Denne |
| 5,853,330 A | | 12/1998 | Engstrand |
| 5,931,739 A | | 8/1999 | Layer et al. |
| 5,971,375 A | | 10/1999 | Simonian et al. |
| 6,022,005 A | | 2/2000 | Gran et al. |
| 6,077,078 A | | 6/2000 | Alet et al. |
| 6,315,094 B1 | | 11/2001 | Griffin et al. |
| 6,634,885 B2 | | 10/2003 | Hodgetts et al. |
| 2003/0168295 A1 | | 9/2003 | Han et al. |
| 2003/0183995 A1 | | 10/2003 | Edberg et al. |

FOREIGN PATENT DOCUMENTS

JP 60146931 8/1985

OTHER PUBLICATIONS

European Search Report of EP6254240; Apr. 12, 2010; Giemsa, Falk; Munich.

* cited by examiner

*Primary Examiner*—Xuan M Thai
*Assistant Examiner*—Evan R Page
(74) *Attorney, Agent, or Firm*—Osler, Hoskin & Harcourt LLP

(57) ABSTRACT

A multiple degree-of-freedom motion simulator assembly comprises a fixed base, a displaceable simulator platform, and a plurality of linear actuators having upper ends thereof interconnected with the platform and lower ends thereof interconnected with the fixed base. A vibration damping unit is disposed between at least one of each of the upper ends and the platform and each of the lower ends and the fixed base. The damping units include at least a first resilient member preloaded and mounted to a major surface of a plate of the damping unit engaged to one of the ends of the linear actuator. The first resilient member provides vibration absorption such as to damp vibrations transmitted from the plate to the platform or base in at least a direction substantially perpendicular to the major surface.

28 Claims, 5 Drawing Sheets

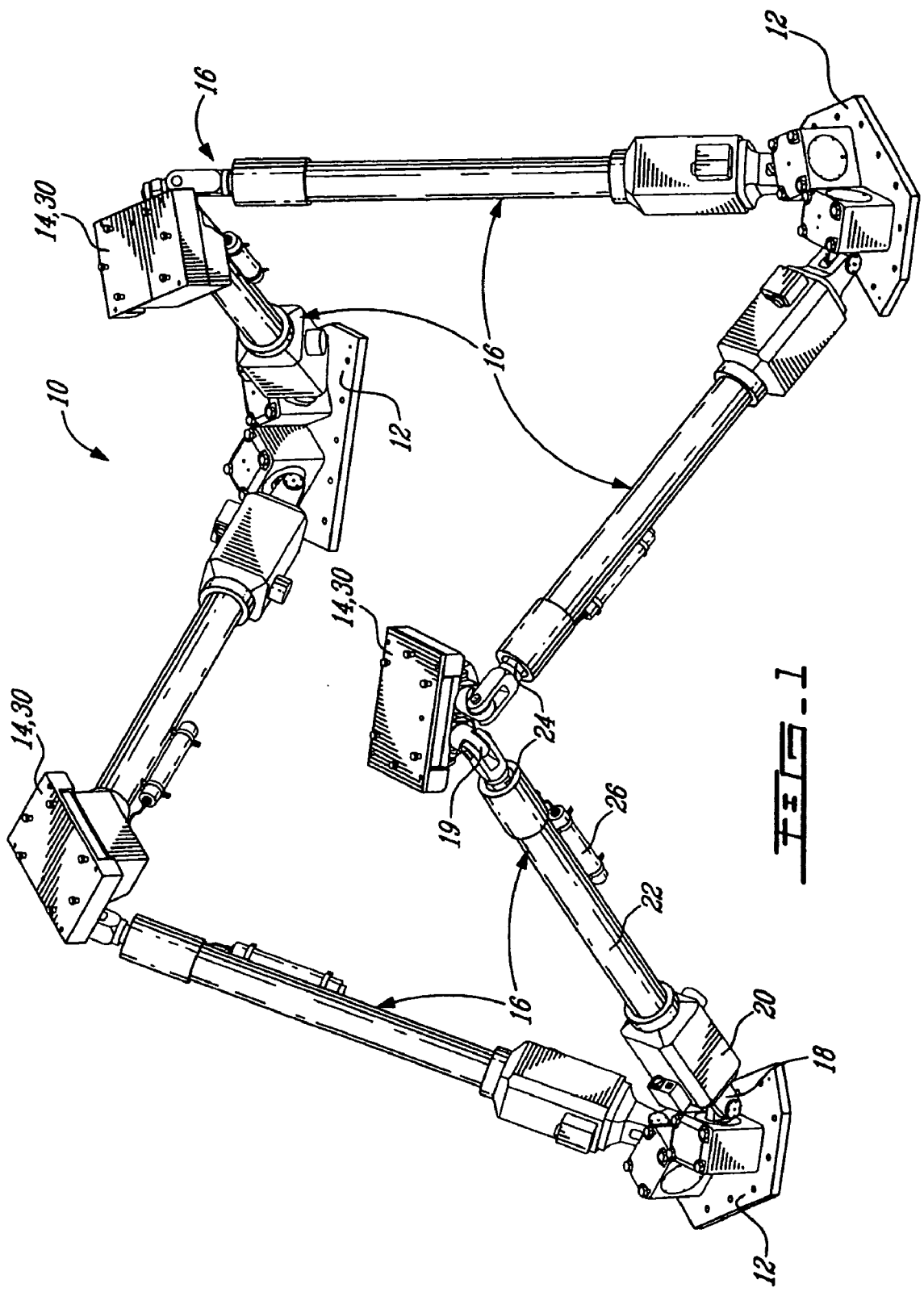

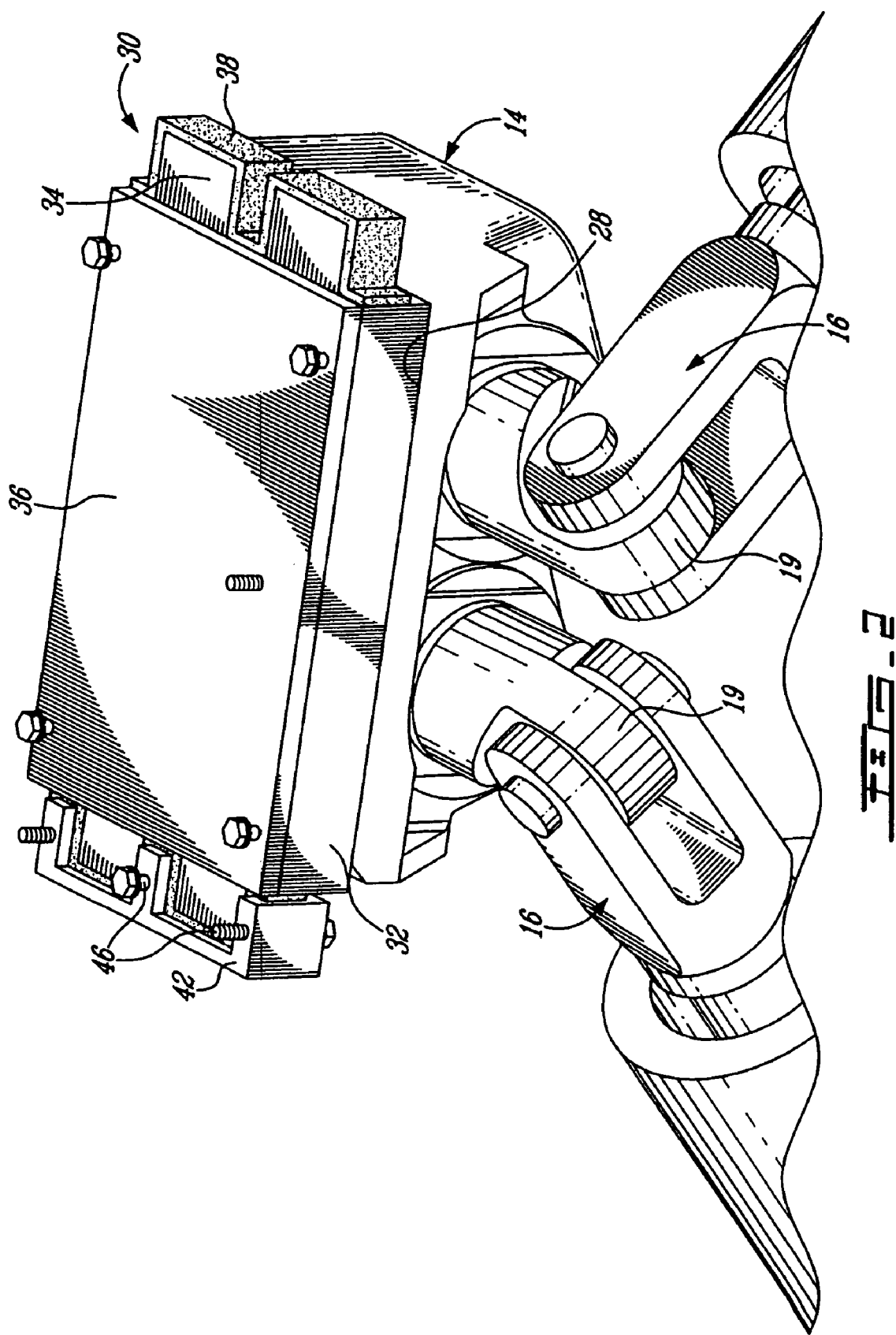

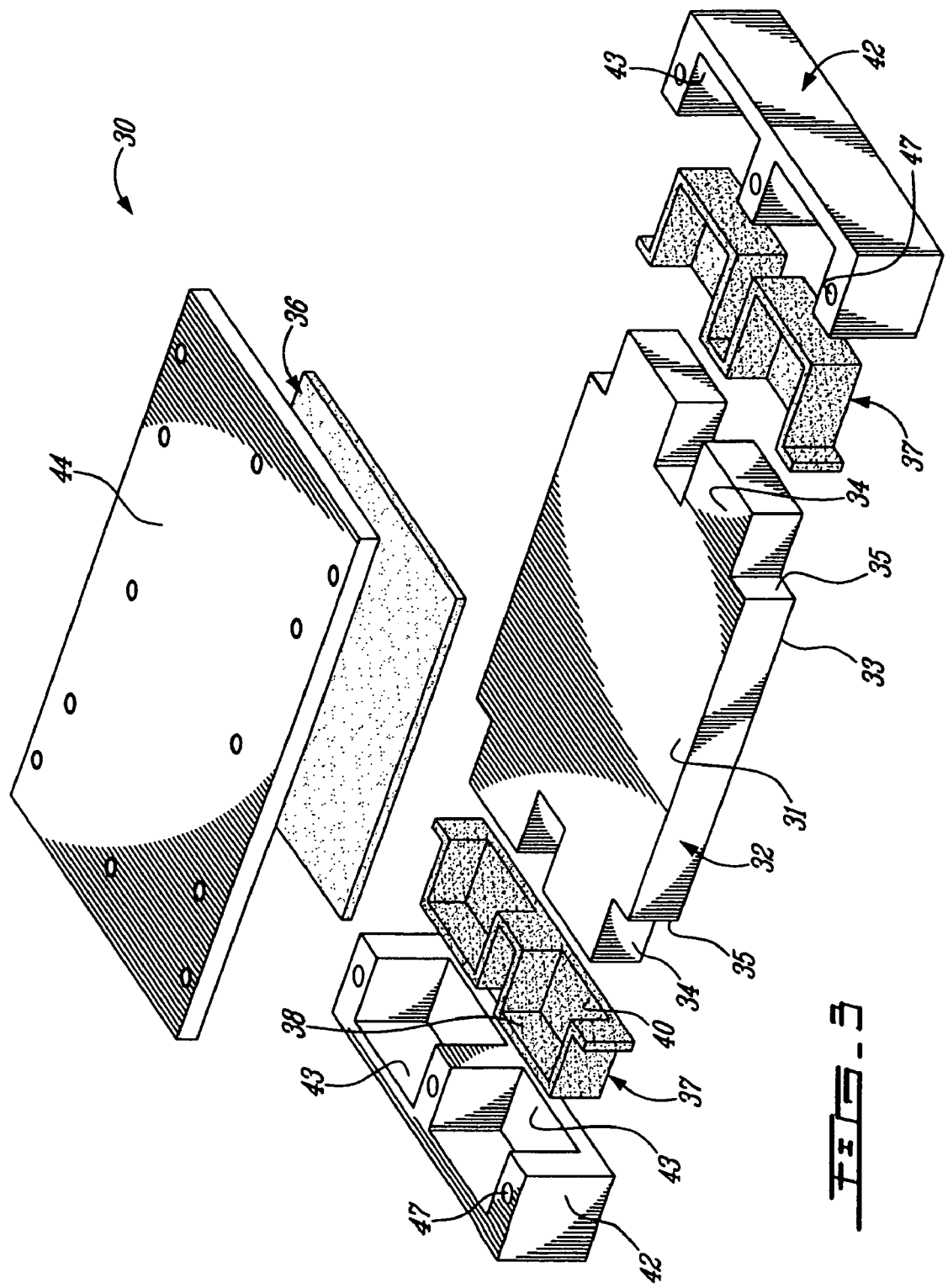

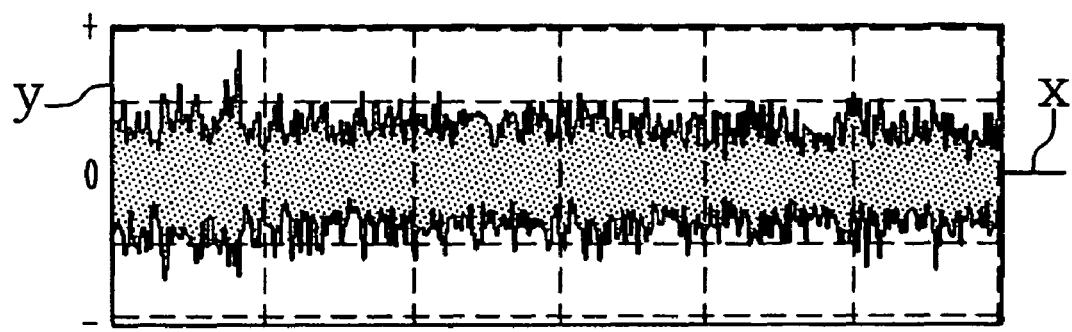
FIG_4A
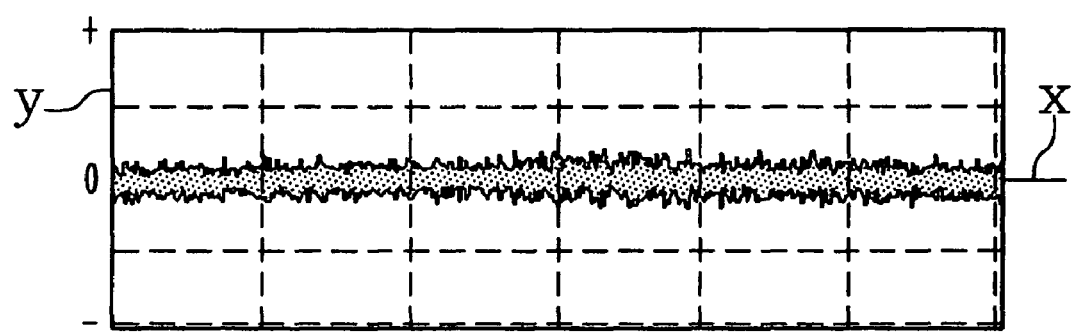
FIG_4B

METHOD AND APPARATUS FOR DAMPING VIBRATIONS IN A MOTION SIMULATION PLATFORM

TECHNICAL FIELD

The present invention relates to moveable platforms, particularly platforms of motion simulators, and more particularly to the damping of vibrations in such platforms.

BACKGROUND OF THE ART

Motion simulators are used for a variety of purposes, including entertainment and flight simulation for example, and usually comprise an upper platform which is mounted for movement relative to a fixed lower base and is operatively connected thereto by a plurality of actuators which move the platform as required in a desired number of degrees of freedom. Generally, undesirable vibrations are required to be limited as much as possible in order to minimize audible noise and wear of the simulator parts. In flight simulators, unwanted vibrations felt by the pilot can result in un-realistic representations of the performance and feel of the true airplane or helicopter. However, such a flight simulator must nonetheless reproduce certain vibrations which are true to those experienced in the actual aircraft, such as certain low frequency vibrations for example.

In most known motion simulation system hydraulic actuators are used, as opposed to other types of linear actuators, as these actuators are well proven and produce minimal undesirable vibrations. However, hydraulic actuators present several disadvantages, among which are a high maintenance requirement, the need for costly and noisy accessory equipment such as pumps, hosing and the like, the risk of contamination or leakage of the hydraulic fluid, and a low energy efficiency.

Electromechanical linear actuators require less maintenance than hydraulic actuators, and are generally less complex and costly to operate. However, electromechanical linear actuators have proved to date unable to cost-effectively reproduce the performance of their hydraulic counterparts, as many electromechanical linear actuators produce more undesirable vibrations, which are ultimately transferred to the motion platform and therefore the user therein, causing an elevated audible noise level in the motion cabin and a reduced life of the actuated equipment as a result of the additional vibrations. Flight simulators incorporating pneumatic or hydraulic damping systems are known, and typically attempt to reduce all transmitted vibrations by reducing the actuator load. Such damping systems are generally complex, costly and include a high number of parts which further augments the risk of equipment failure. Moreover, in most cases, control systems are necessary to prevent a failure of the damping system from damaging the motion simulator cabin or endangering a user of the motion simulator.

Other simpler vibration dampers for use with actuators are known, but are impractical for many applications including flight simulators because such dampers generally reduce all vibrations, including the desirable "cues" which the flight simulator must reproduce in order to adequately simulate an aircraft environment.

SUMMARY OF INVENTION

It is therefore an aim of the present invention to provide an improved vibration damping unit for a platform of a motion simulator.

It is also an aim of the present invention to provide a six degree-of-freedom motion simulator platform assembly including an improved vibration damping unit.

Therefore, in accordance with one aspect of the present invention, there is provided a damping unit for an actuated motion platform, the damping unit including: a plate having a top surface, a bottom surface and opposed lateral plate surfaces, the bottom surface being adapted to be rigidly connected to a vibration source; lateral mounting supports receiving at least portions of said lateral plate surfaces and being adapted for rigid fastening to the platform; a first resilient member overlying said top surface of said plate and being retained between the top surface and the platform by said lateral mounting supports, said first resilient member providing vibration absorption such as to limit vibrations transmitted from said plate to said platform in at least a direction substantially perpendicular to said top surface; a second resilient member disposed between each of said at least portions of said lateral surfaces of said plate and said lateral mounting supports, said second resilient members providing vibration absorption such as to limit vibrations transmitted from said plate to said platform in at least a direction substantially parallel to said top surface; and wherein at least a selected frequency range of vibrations generated by the vibration source are dampened by the damping unit thereby limiting unwanted vibrations which are transmitted to the motion platform.

There is also provided, in accordance with an aspect of the present invention, a multiple degree-of-freedom motion simulator assembly comprising: a fixed base; a displaceable simulator platform; a plurality of extensible and retractable linear actuators having upper ends thereof interconnected with the platform and lower ends thereof interconnected with the fixed base, the linear actuators being operable to displace the simulator platform in said multiple-degrees-of-freedom relative to said fixed base; a vibration damping unit disposed between at least one of each of said upper ends and the platform and each of said lower ends and the fixed base, each said damping unit including at least a first resilient member preloaded and mounted to an abutting major surface of a plate of said damping unit engaged to said at least one upper and lower ends of said linear actuator; and wherein said first resilient member provides vibration absorption such as to damp vibrations transmitted from said plate to at least one of said platform and said fixed base in at least a direction substantially perpendicular to said major surface.

There is also provided, in accordance with another aspect of the present invention, an electromechanical linear actuator for a motion simulator system having a motion platform displaceable in multiple degrees-of-freedom relative to a fixed base by at least one of said actuators, the electromechanical linear actuator comprising: first and second telescoping cylindrical members defining a common longitudinal axis, a lower end of said first cylindrical member having a first joint adapted for engagement with said fixed base and an upper end of said second cylindrical member having a second joint adapted for engagement with said motion platform; a drive mechanism operable to extend and retract said first and second cylindrical member relative to each other to displace the motion platform relative to said fixed base; and a vibration damping unit engaged with at least one of said lower and upper ends, said vibration damping unit comprising at least one resilient member disposed between one of said lower and upper ends and said fixed base and motion platform respectively, said vibration damping unit providing vibration absorption such as to damp at least undesirable vibrations transmitted from said linear actuator to said platform in at least a direction substantially parallel to said longitudinal axis.

There is further provided, in accordance with another aspect of the present invention, a method of selectively damping vibrations in a motion simulator platform using a selective damping unit having at least one resilient member, the method comprising the steps of: choosing a first limit corresponding to a maximal frequency of desirable vibration inputs used during an operation of the motion simulator platform; establishing a second limit corresponding to a minimum frequency for undesirable vibrations during the operation of the motion simulator platform, the second limit being higher than the first limit; selecting a target natural frequency located between the first and second limits; choosing appropriate characteristics of said resilient member to produce a natural frequency of the selective damping unit which approximates the target natural frequency; absorbing the undesirable vibrations with the selective damping unit; and transmitting the vibration inputs to the platform through the selective damping unit.

BRIEF DESCRIPTION OF THE DRAWINGS

Reference will now be made to the accompanying drawings, showing by way of illustration a preferred embodiment of the present invention and in which:

FIG. 1 is a perspective view of a motion system of a motion simulator platform, for which a damping unit according to the present invention is provided;

FIG. 2 is a partial perspective view of a damping unit according to one embodiment of the present invention, wherein the damping unit is mounted to a bearing block connected to an upper end of an actuator of the motion system of FIG. 1;

FIG. 3 is an exploded perspective view of the damping unit of FIG. 2;

FIG. 4a is a plot illustrating measured vibrations in a motion simulator platform without any vibration damping units of FIG. 2 installed;

FIG. 4b is a plot illustrating measured vibrations in a motion simulator platform with the damping units of FIG. 2 installed.

DETAILED DESCRIPTION OF THE PREFERRED EMBODIMENTS

Figure 5:
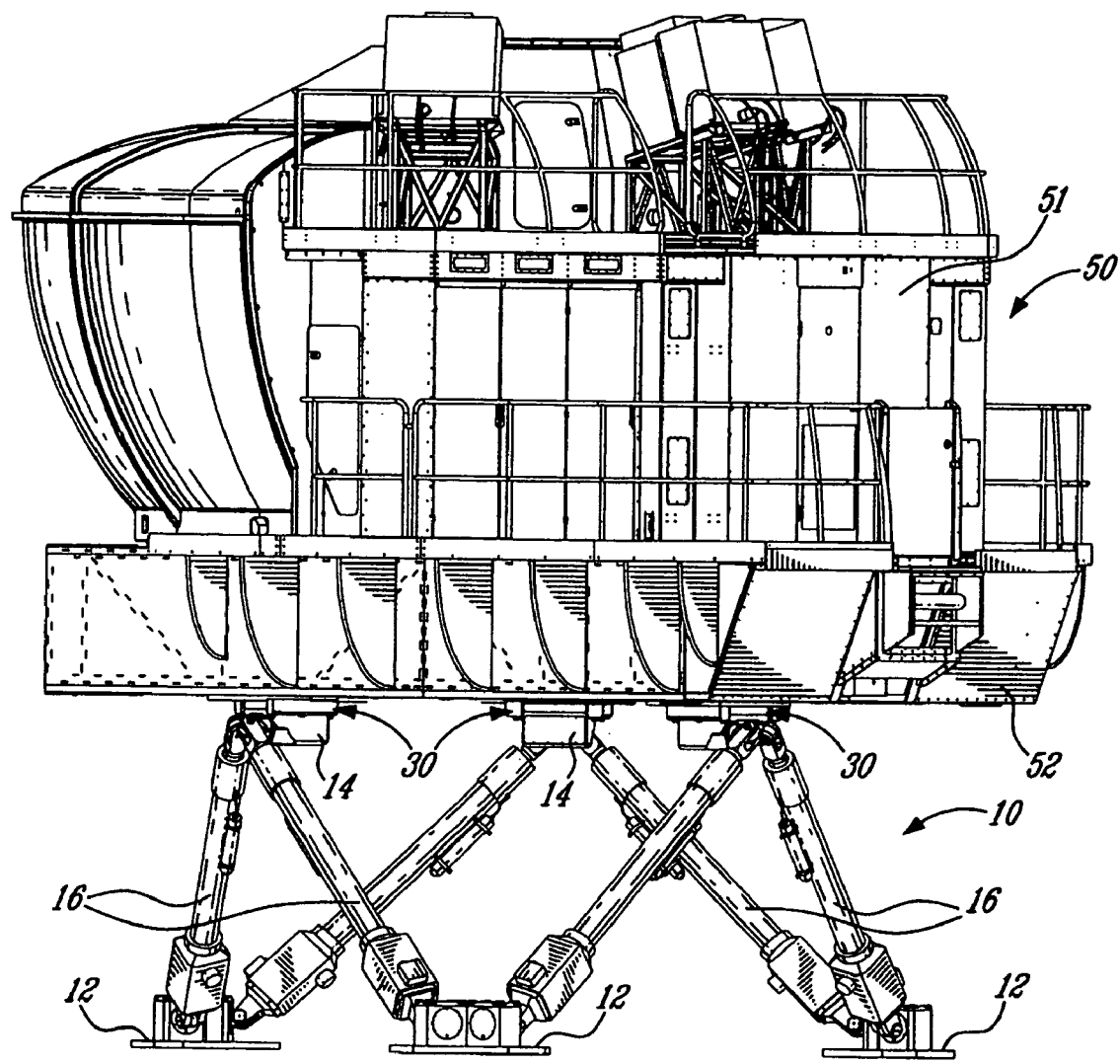
FIG. 5 is a schematic side elevation view of a motion simulator having a simulator cabin mounted on a motion platform which is displaceable by a motion system similar to that of FIG. 1, the vibration damping units of the present invention being installed between the actuators of the motion system and the displaceable motion platform.

Referring now to FIG. 1, a motion system 10 for a displaceable motion platform, such as that of a motion simulator, of the type commonly known as a Stewart platform is shown. The platform assembly 10 includes a base formed of three base plates portions 12 fixed to an underlying support surface and therefore fixed relative to one another, six mobile and extensible legs or actuators 16 which have lower ends thereof engaged to the base plate portions 12 and opposed upper ends engaged to at least three bearing block assemblies 14 which support the moving platform of the motion simulator cabin. Such a motion system 10 is used to displace a motion simulator 50, such as that depicted in FIG. 5, which generally includes a simulator cabin 51 mounted on a displaceable motion platform 52. The motion platform 52 is displaced and controlled by linear actuators 16 such as those of the motion system 10. In the embodiment of FIG. 5, the vibration damping units 30 of the present invention, which will be described in further detail below, are disposed between the upper ends of each of the actuators 16 and the motion platform 52, and more precisely between the bearing blocks 14, to which the actuators 16 are pivotably engaged, and the motion platform 52.

Each of the actuators 16 is preferably a linear actuator and includes a first universal joint 18 on one (lower) end and a second universal joint 19 on the opposed (upper) end. The first universal joint 18 is operably connected to one of the base plate portions 12, and the second universal joint 19 is connected to one of the bearing blocks 14. Each of the platform's six linear actuators 16 has two relatively telescoping parts, with a piston-like degree of freedom therebetween. The six linear actuators 16 with the universal joints 18,19 on either end thereof provide the platform supported by the bearing block assemblies 14 with six degrees of freedom, three rotational and three translational. Each base plate 12 has the lower ends of two actuators 16 mounted thereto, each of these same two actuators being engaged at their upper ends to different bearing blocks 14. Thus, each actuator 16 is connected to a bearing block 14 along with a first adjacent actuator, and to a base portion along with a second adjacent actuator. Such a configuration allows the platform to move with respect to the base about six degrees of freedom.

The actuators 16 are linear actuators, and more preferably electromechanical actuators. Although the present invention will be generally described with respect to its use with electromechanical linear actuators, it is to be understood that other suitable types of linear actuators, such as hydraulic actuators for example, can also be used. Each electromechanical linear actuator 16 may be of a known type and as such includes a drive mechanism, which may include an electric motor 20 having a rotatable output shaft (not shown), an outer tube or cylindrical member 22 surrounding a lead screw (not shown) connected to the output shaft, an extensible inner tube or cylindrical member 24 containing an internal nut (not shown) engaged with the lead screw such that turning of the screw by the motor 20 extends or retracts the inner tube 24 which acts as the outer extensible end of the actuator, and a position feedback transducer 26 to determine the position of the inner cylindrical member 24 with respect to the outer cylindrical member 22. Such an actuator configuration is well known in the art and as such will not be described further herein. The electromechanical linear actuators depicted and described herein are but one type of such electrically-powered linear actuators which can be employed with the vibration damping unit of the present invention, and it is to be understood that other varieties of electromechanical linear actuators can be similarly used. For example, such alternate electrically-powered linear actuators could have side mounted motors, rather than the inline type depicted herein, or other drive mechanisms such as those which are belt and/or gear driven. While several advantages exist with all such electromechanical actuators 16, they generally generate more vibrations than comparative hydraulic actuators which particularly causes, among other things, undesirable audible noise. As such, additional damping of such vibrations is necessary for applications in which undue additional vibrations, particularly vibrations causing audible noise, are undesirable.

Referring to FIGS. 2-3, the selective vibration damping unit 30 is shown. The damping unit 30 is engaged with each of the bearing block 14, preferably being located between the bearing blocks 14 and the superimposed motion simulator platform supported thereby, in order to isolate the platform from unwanted vibrations produced by the linear actuators 16. In the embodiment depicted, the vibration damping unit 30 is mounted to a flat upper surface 28 of each of the bearing blocks 14. Portions of the damping unit 30, as will be described in further detail below, are in turn fastened to an underside of the motion platform. The damping unit 30, when so installed, accordingly acts to damp unwanted vibrations which may originate in the actuator 16, in order to prevent them from passing, at least un-attenuated, upwards through the bearing block 14 and into the motion platform. Therefore, each of the damping units 30 acts to vibrationally isolate the motion platform which is mounted to the bearing blocks 14 of the motion system. The vibration damping unit 30 generally comprises at least a lower "floating" bearing plate 32, resilient members 36 and 37 generally disposed on all sides of at least a portion of the bearing plate 32, and lateral mounting supports 42 retaining the assembly together and used to mount the damping unit to the motion platform. In the embodiment depicted, best seen in FIG. 3, an upper mounting plate 44 is also preferably provided above the upper resilient member 36.

In FIG. 2, the damping unit 30 is shown mounted to the upper surface 28 of the bearing block 14, to which the upper ends of the two adjacent linear actuators 16 are engaged via the universal joints 19. However, in FIG. 2 the upper mounting plate 44 and one of the two opposed lateral mounting supports 42 have been removed for clarity. The universal joints 19 at the upper ends of the linear actuators 16 are mounted to the bearing block 14 as depicted in a cantilevered type manner, wherein the longitudinal axes of the linear actuators are offset relative to the center of the bearing block 14. This can provide certain spatial advantages, however can result in eccentric loads on the bearing block 14 and therefore on the damping unit 30 mounted thereto. It is to be understood, however, that other, such as in-line (i.e. non-cantilevered type), bearing joint arrangements can similarly be used.

Referring now generally to FIG. 3, the bearing plate 32 is preferably made of aluminum and has a flat bottom surface 33 which abuts the corresponding flat surface 28 of the bearing block 14 and is similarly sized. The bearing plate 32 is rigidly fastened to the bearing block 14, such as via suitable threaded fasteners for example. Accordingly, any vibrations produced by the linear actuator 16 or other vibration source interconnected, either directly or indirectly, to the bearing block 14 is transmitted directly through to the bearing plate 32 of the damping unit 30. However, as noted above, this bearing plate 32 is said to be "floating", in that it is vibrationally isolated from the lateral mounting supports 42 and the upper mounting plate 44, which are fastened to the motion platform, by first and second resilient members 36 and 37.

The bearing plate 32 preferably defines a rectangular shape, and includes lateral projections 34, or "wings", on opposed sides thereof. These lateral projections 34 preferably include two projections protruding from each of two opposed lateral sides 35 of the bearing plate 32. These lateral projections 34 are received within corresponding openings 43, which are defined within the lateral mounting supports 42 and open upwards (i.e. towards the motion platform). However, the second, or lateral, resilient members 37 are first received within said openings 43, and are therefore located between the lateral projections 34 and the inner surfaces of the openings 43 within the mounting supports 42. The lateral resilient members 37 include side portions 38 and lower portions 40 which are adapted to abut all but an upper surface portion of the lateral projections 34, thereby completely separating the lateral projections 34 of the bearing plate 32 from the mounting supports 42. The lateral resilient members 37 therefore act as side and lower shock absorbers. Much as per the upper resilient member 36 described below, the later resilient members 37 are preferably made of a resilient material such as an elastomer, rubber and/or a compound thereof.

Although in the depicted preferred embodiment the lateral resilient members 37 disposed on opposed sides of the bearing plate 32 are each a one-piece unit, each preferably including two sets of side and lower portions 38,40 (one for each of the two lateral projections 34), it is to be understood that the side and lower portions 40 of each projection could be separate pieces of the resilient material, each inserted individually into the openings 43 defined in the later mounting supports 42.

As the openings 43 in the lateral mounting supports 42 have a closed lower surface, the lateral projections of the bearing plate which are received therein cannot drop out therefrom in a vertical direction, and once the two opposed lateral mounting supports 42 are fastened to the motion platform, the bearing plate 42 is securely retained thereby to provide a fail-safe assembly. Particularly, should any of the resilient material fail, the lateral projections 34 of the bearing plate would merely drop slightly within the openings 43, however would be prevented from any further movement and retained in place by the rigidly fastened lateral mounting supports 42 which are fastened to the motion platform.

Overlaid on top of an upper surface 31 of the large bearing plate 32 is provided the first, or upper, resilient member 36 which provides vibration damping in a vertical direction. This upper resilient member 36 is mat like, defining a much larger surface area than the second, or side/lower, resilient members 37, and overlying at least a portion of a major surface 31 of the "floating" bearing plate 32. Accordingly, the relatively thin upper resilient member 36 is vertically disposed, or rather sandwiched, between the bearing plate 32 and the under surface of the mounting platform, or alternately of a flat upper mounting plate 44 rigidly fastened thereto. The upper mounting plate 44 is preferably made of steel. The upper resilient member 36 is preferably also made of an elastomer, a rubber and/or a compound thereof.

A plurality of bolts 46 or other suitable fasteners are used to fasten the lateral mounting supports 42 to the motion platform. The upper mounting plate 44 is also fastened to the motion platform, and abuts the large upper resilient member 36 but is not fastened relatively thereto. Accordingly, only these two elements are rigidly fixed to the motion platform. The bearing plate 32 which is fixed to the bearing block 14 is therefore retained within the damping unit 30 via the resilient members 36,37 such that it is vibrationally isolated from the structures (i.e. at least the lateral mounting supports) of the damping unit 30 which are rigidly connected to the motion platform.

As noted above, the lateral mounting supports 42 which retain the damping unit 30 together are preferably fastened to the underside of the motion platform, or alternately to the upper mounting plate 44 which is itself fixed to the motion platform, by a plurality of threaded fasteners (for example bolts) 46 which are received within corresponding internally threaded holes 47 defined in the mounting supports 42. Accordingly, tightening the fasteners 46 applies pressure to compress at least the upper resilient member 36 between the floating bearing plate 32 and the motion platform and to compress the lower portions 40 of the lateral resilient members 37 between the mounting supports 42 and the bearing plate 32. This applies a compressive preload to at least these resilient members, thereby improving the resistance thereof to tensile forces. Such a compressive preloading is preferred, so as to at least limit, if not eliminate, the exposure of the resilient members to tensile forces. Such a preloading improves fatigue life of the selective damping unit 30 as well as helps to prevent backlash on load reversal of the motion platform. While the amount of preload can be varied via the fastening means used to compress the resilient members prior to use of the damping unit, other characteristics can also be varied in order to control the amount and distribution of preload in the resilient members. For example, the offset bearing setup of the bearing block 14 depicted in FIG. 2 can result in eccentric loading of the damping unit, and therefore the resilient members, thereabove. Accordingly, in one embodiment, the load on the resilient members, and particularly of the upper resilient member 36, can be normalized by having a non-uniform shape (for example, cross-sectional thickness) in order to maintain a relatively constant preload when such resilient members are exposed to non-uniform loading. Therefore, the physical characteristics of the resilient members can be predetermined and selected in order to counter-balance any non-uniform loading which may be expected in the damping unit due to the particular setup and characteristics of any given application. In at least one embodiment, for example, the upper resilient member 36 is provided with a gradually varying cross-sectional area such that one end thereof is thicker than an opposed end. Thus, a relatively constant preload of the resilient member is maintained when it is subjected to the expected non-uniform loading.

As mentioned above, some electromechanical linear actuators 16 can produce significant vibrations, particularly along the axis of actuation (i.e. the longitudinal axis of the liner actuator), which is subsequently transmitted through to the bearing block 14. Without a suitable vibration damper/isolator as per the damping unit 30, undesirable vibrations are transferred through to the motion platform and the simulator cabin thereon, causing audible noise and other unwanted vibrations within the simulator cabin.

The damping unit 30 accordingly provides vibration damping in at least a first direction substantially perpendicular to the motion platform (and therefore to the upper surface 31 of the plate 32 of the damping unit) and at least a second direction substantially parallel to the motion platform (and therefore to the upper surface 31 of the plate 32 of the damping unit) which is normal to the first direction. Preferably, the damping unit 30 provides selective damping in all three axes, namely two orthogonal axes defined in a common plane (such as one parallel to the upper surface 31) and a third axis normal to both of the two orthogonal directions (such as perpendicular to the upper surface 31).

The damping unit 30 further preferably damps unwanted vibrations, such as those producing audible noise for example, which are transferred through to the motion platform from the linear actuators. Such audible noise is especially undesirable in the case of flight simulators used for professional training. On the other hand, it is nonetheless desirable to be able to transmit certain vibrations that are part of the input to the simulator cabin. The damping unit 30 is therefore preferably "tuned" in order to allow for selective damping of certain vibration frequencies, such as high frequency noise-producing vibrations for example, while nevertheless transmitting other wanted vibration frequencies, such as low frequency input vibrations for example. In a preferred embodiment, the damping unit 30 is tuned such as to at least significantly damp undesired high frequency vibrations above a predetermined high frequency threshold, while nevertheless transmitting most low frequency vibrations below a low frequency threshold. In one embodiment, described in further detail below, the high frequency threshold is about 150 Hz and the low frequency threshold is about 50 Hz. However, it is to be understood that other threshold values can be used, and will vary depending on the particular application, the type and number of linear actuators used, etc. The high and low frequency thresholds can also be the same value, such as to permit most vibrations below this value to be transmitted but most vibrations above this value to be damped, or vice versa depending on the given application and particular needs for the damping unit 30.

Referring to FIGS. 4a and 4b, the illustrated plots depicts measured vibrations transmitted from the linear actuators to the motion platform of a motion simulator system. In both plots, the X axis represents time, and the Y axis represents amplitude of the vibrations. FIG. 4a is a plot of vibrations measured in a motion simulator platform without any vibration damping devices installed. FIG. 4b depicts a plot of vibrations measured in the same motion simulator platform having selective damping units 30 installed between each of the linear actuators and the platform. As clear from FIG. 4b, the vibration amplitudes transmitted from the linear actuators to the platform with the damping units installed therebetween are significantly less than those for the un-damped system (in FIG. 4a), being preferably reduced by at least a factor of 2.5 for average vibration levels and up to at least a factor of 5 for certain peak vibration levels. Preferably, above the high frequency threshold, vibration levels may be reduced by at least a factor of 10.

In use, a maximum frequency for the input vibrations that need to be transmitted is chosen; this will be the first frequency limit. Then, the frequencies of the undesirable vibrations in the motion simulator are measured to establish the minimum frequency for the vibrations that need to be dampened; this will be the second frequency limit. This is preferably done using a motion simulator having a "dead" cab, i.e. without any disturbing vibration sources within. A target natural frequency for the selective damping unit 30 is then established considering these two frequency limits. The target natural frequency is preferably chosen such that it is situated between the first and second frequency limits, and is preferably, in at least one embodiment, about one half of the square of the second frequency limit. Then, the natural frequency of the selective damping unit is adjusted by varying the thickness and material characteristics of the resilient members 36,37, usually through well known computer generated calculation techniques, until the target natural frequency is achieved. Since they have a relatively smaller effective area, the lateral resilient members 37 may be exposed to larger stresses for a given compressive force, therefore the material selected may have a different Young's modulus than that of the larger upper resilient member 36. Preferably, the lateral resilient members 37 have a Young's modulus higher than that of upper resilient member 36.

In one example, the first frequency limit was established at 50 Hz, and the second frequency limit at 150 Hz. A target natural frequency of the simulator was thus set at 70 Hz. Suitable elastomer materials were chosen for each of the lateral resilient members 37 and the upper resilient member 36, wherein the Young's modulus of the material of the lateral resilient members 37 is greater than that of the upper resilient member 37. In at least one embodiment, the Young's modulus of the lateral resilient members 37 is twice that of the upper resilient member 36. The thicknesses of the upper resilient member 36 and the lateral resilient members 37 were then varied, not necessarily uniformly, until the target natural frequency was reached, using computer simulations to establish the natural frequency for each thickness increment. The selective damping units 30 with a natural frequency of about 70 Hz were then installed on a flight simulator. A beginning of frequency isolation of 100 Hz was measured, with a 6 dB attenuation around 200 Hz. Thus, vibrations having a frequency above 150 Hz were effectively dampened, while vibrations having a frequency lower than 50 Hz were effectively transmitted. This is however but one example of the possible configurations of the vibration damping units of the present invention, suitable for one motion system using particular linear actuators. It is to be understood that as the vibrations produced by other electromechanical linear actuators will differ, the target natural frequency desired for the damping units 30 will vary given the particular application and equipped used. Accordingly, by appropriately selecting the characteristics of the resilient members, such as material type, stiffness, size, etc., the damping units 30 can be "tuned" as required to achieve a determined target natural frequency. While the first (lower) and second (upper) frequency limits can vary, at least the second frequency limit can do so considerably, in order to best correspond to the undesirable frequencies which the damping unit is to absorb (i.e. damp). The second frequency limit is at least equal to or greater than the first frequency limit.

The vibration damping units 30 of the present invention provide several advantages, one of which being the fact that failure of the resilient members 36, 37 will not endanger the user of the simulator, since the motion platform will still be solidly attached to the bearing blocks 14 through the lateral support members 42 and the bearing plate 32, regardless of any shift of the bearing plate within the lateral supports due to failure of the resilient members therebetween. Thus, no additional control system is necessarily required to provide back up in case of failure of the resilient members. Further, the selective damping unit 30 is generally less costly than most prior art damping units for motion simulators, which generally require complex assemblies. Moreover, the selective damping unit 30 is cost and time effective to manufacture, having a limited number of components which further reduces the risk of malfunction and/or failure of the elements thereof.

The embodiments described above are intended to be exemplary. Those skilled in the art will therefore appreciate that the foregoing description is illustrative only, and that various alternatives and modifications can be devised without departing from the spirit of the present invention.

For example, the damping unit 30 can easily be adapted to moving platforms other than six-degree of freedom simulator systems, such as amusement or entertainment systems for example, and can be driven by hydraulic, electromechanical or other types of actuators, or which are exposed to other sources of vibrations, such as in various types of vehicles, industrial equipment, etc. The damping unit 30, while preferably being capable of selective damping of unwanted vibrations, can also be simply used to reduce all vibrations which would otherwise be transmitted from a source of vibrations to a moving platform connected thereto, such as to at least limit either audible or physical vibrations in the platform. In an alternative embodiment, the damping units 30 can be disposed either beneath the bearing blocks on each base portion 12 that receive the universal joints 18 or between each base plate 12 and the underlying fixed support surface. In another alternative embodiment, the upper resilient member 36 can be replaced with resilient inserts disposed around each of the bolts 46 which mount either the lateral support members 42 or the bearing plate 32 to the superimposed platform, with a Bellville-type spring being additionally provided between the head of each bolt and the platform structure. Accordingly, the vibrations felt in the bearing block are damped such as to limit their transmission through to the platform. In addition thereto, silent-block type resilient inserts can be provided within the output pins of the universal joints 19 within the bearing blocks 14.

Accordingly, the present invention is intended to embrace all such alternatives, modifications and variances which fall within the scope of the appended claims.

The invention claimed is:

1. A damping unit for an actuated motion platform, the damping unit including:
   a planar plate having a top surface, a bottom surface and opposed lateral plate surfaces, the bottom surface being adapted to be rigidly connected to a vibration source, the opposed lateral plate surfaces being disposed between the top surface and the bottom surface, the lateral plate surfaces including lateral projections, the lateral projections each having a top surface, a bottom surface, and at least three lateral surfaces;
   lateral mounting supports each receiving at least one of the lateral projections and being adapted for rigid fastening to the platform;
   at least one first resilient member overlying at least a portion of the top surface of the plate and being adapted to be retained between the top surface and the platform, the at least one first resilient member providing vibration absorption such as to limit vibrations transmitted from the plate to the platform in at least a direction substantially perpendicular to the top surface;
   at least one second resilient member, each of the at least one second resilient member being disposed between the at least three lateral surfaces of at least one of the lateral projections and a corresponding one of the lateral mounting supports in a first direction substantially parallel to the top surface and in a second direction substantially parallel to the top surface, the first direction being substantially perpendicular to the second direction, such that the lateral mounting supports constrain the at least one second resilient member in at least the first and second directions, the at least one second resilient member providing vibration absorption such as to limit vibrations transmitted from the plate to the platform in at least the first and second directions, the at least one second resilient member being separate from the at least one first resilient member, the lateral mounting supports retaining the lateral projections therein and limiting movement of the lateral projection in the first and second directions in case of failure of the at least one second resilient member, the lateral mounting supports limiting rotation of the plate about an axis perpendicular to the top surface in case of failure of the at least one second resilient member; and
   wherein at least a selected frequency range of vibrations generated by the vibration source are dampened by the damping unit thereby limiting unwanted vibrations which are transmitted to the motion platform.

2. The damping unit according to claim 1, wherein the selected range of vibrations are those having a frequency at least higher than a predetermined second limit;
   wherein vibrations generated by the vibration source having a frequency at least higher than the second limit are damped by the damping unit and vibrations generated by the vibration source having a frequency at least lower than a first limit are transmitted through the damping unit, such as to damp the selected range of vibrations at least above the second limit.

3. The damping unit according to claim 2, wherein the second limit is at least about 100 Hz.

4. The damping unit according to claim 3, wherein the second limit is about 150 Hz.

5. The damping unit according to claim 2, wherein the first limit is about 50 Hz.

6. The damping unit according to claim 1, further comprising an upper mounting plate fastenable to the platform, the upper mounting plate overlying the at least one first resilient member and being adapted to be disposed between the platform and the at least one first resilient member.

7. The damping unit according to claim 1, wherein the at least one second resilient member and the lateral mounting supports are configured to receive the lateral projections in openings defined therein.

8. The damping unit according to claim 7, wherein the openings are closed-bottom, such that the plate is held captive within the lateral mounting supports.

9. The damping unit according to claim 1, wherein at least the at least one first resilient member is adapted to be preloaded by compression thereof between the plate and the platform by the lateral mounting supports.

10. A multiple degree-of-freedom motion simulator assembly comprising:
a fixed base;
a displaceable simulator platform;
a plurality of extensible and retractable linear actuators having upper ends thereof interconnected with the platform and lower ends thereof interconnected with the fixed base, the linear actuators being operable to displace the simulator platform in the multiple-degrees-of-freedom relative to the fixed base;
a vibration damping unit disposed between at least one of each of the upper ends and the platform and each of the lower ends and the fixed base, each damping unit including:
at least one first resilient member preloaded and mounted to an abutting major surface of a planar plate of the damping unit engaged to the at least one upper and lower ends of the linear actuator, the plate having a top surface, a bottom surface and opposed lateral plate surfaces, the bottom surface being adapted to be rigidly connected to a vibration source, the opposed lateral plate surfaces being disposed between the top surface and the bottom surface, the lateral plate surfaces including lateral projections, the lateral projections each having a top surface, a bottom surface, and at least three lateral surfaces, and
at least one second resilient member, each of the at least one second resilient member being sandwiched between the at least three lateral surfaces of at least one of the lateral projections and a corresponding one of at least two lateral mounting supports in at least two different directions within a plane substantially parallel to the major surface, the at least two different directions being substantially perpendicular to each other, the lateral mounting supports being fixed to the at least one of the platform and the fixed base, the lateral mounting supports constraining the at least one second resilient member and the plate along the at least two different directions, the at least one second resilient member being separate from the at least one first resilient member; and
wherein the at least one first resilient member provides vibration absorption such as to damp vibrations transmitted from the plate to at least one of the platform and the fixed base in at least a direction substantially perpendicular to the major surface, the at least one second resilient member provides vibration absorption such as to damp vibrations transmitted from the plate to the at least one of the platform and the fixed base in the plane substantially parallel to the major surface, the at least two lateral mounting supports retaining the lateral projections therein and limiting movement of the lateral projection in the at least two different directions within the plane substantially parallel to the major surface in case of failure of the at least one second resilient member, and the at least two lateral mounting supports limiting rotation of the plate about an axis perpendicular to the major surface in case of failure of the at least one second resilient member.

11. The assembly according to claim 10, wherein the damping units are mounted between the upper ends of the linear actuators and the platform, and wherein the lateral mounting supports include a pair of opposed lateral mounting supports fixed to the platform.

12. The assembly according to claim 11, wherein each one of the plurality of linear actuators is an electromechanical actuator.

13. The assembly according to claim 12, wherein the damping unit is operable to damp at least a selected frequency range of vibrations transmitted from the linear actuators to the platform, thereby limiting unwanted vibrations in the platform within the selected frequency range.

14. The assembly according to claim 13, wherein the selective damping unit effectively dampens vibrations having a frequency above at least about 100 Hz.

15. The platform assembly according to claim 13, wherein the selective damping unit effectively transmits vibrations having a frequency below at least about 50 Hz.

16. An electromechanical linear actuator for a motion simulator system having a motion platform displaceable in multiple degrees-of-freedom relative to a fixed base by at least one of the actuators, the electromechanical linear actuator comprising:
first and second telescoping cylindrical members defining a common longitudinal axis, a lower end of the first cylindrical member having a first joint adapted for engagement with the fixed base and an upper end of the second cylindrical member having a second joint adapted for engagement with the motion platform;
a drive mechanism operable to extend and retract the first and second cylindrical members relative to each other to displace the motion platform relative to the fixed base; and
a vibration damping unit engaged with at least one of the lower and upper ends, the vibration damping unit comprising:
at least one first resilient member mounted to an abutting major surface of a planar plate of the damping unit engaged to the at least one of the lower and upper ends and adapted to be disposed between the major surface and the respective one of the fixed base and motion platform to damp at least undesirable vibrations transmitted from the linear actuator to the platform in at least a direction substantially perpendicular to the major surface of the plate, the plate having a top surface, a bottom surface and opposed lateral plate surfaces, the bottom surface being adapted to be rigidly connected to a vibration source, the opposed lateral plate surfaces being disposed between the top surface and the bottom surface, the lateral plate surfaces including lateral projections, the lateral projections each having a top surface, a bottom surface, and at least three lateral surfaces; and at least one second resilient member, each of the at least one second resilient member being sandwiched between the at least three lateral surfaces of at least one lateral projection and a corresponding one of at least two lateral mounting supports in at least two substantially perpendicular directions within a plane substantially parallel to the major surface to damp at least undesirable vibrations transmitted from the linear actuator to the platform in at least the plane, the lateral mounting supports being adapted to be fixed to the respective one of the fixed base and motion platform, the lateral mounting supports constraining the at least one second resilient member and the plate in at least the plane, the at least one second resilient member being separate from the at least one first resilient member, the at least two lateral mounting supports retaining the lateral projections therein and limiting movement of the lateral projection in the at least two substantially perpendicular directions within the plane substantially parallel to the major surface in case of failure of the at least one second resilient member, and the at least two lateral mounting supports limiting rotation of the plate about an axis perpendicular to the major surface in case of failure of the at least one second resilient member.

17. The electromechanical linear actuator according to claim 16, wherein the vibration damping unit damps at least a selected frequency range of vibrations transmitted from the linear actuators to the platform, thereby limiting the undesirable vibrations in the platform within the selected frequency range.

18. The electromechanical linear actuator according to claim 17, wherein the selected frequency range corresponds to audible vibrations produced in the platform from vibrations generated by the linear actuator.

19. The electromechanical linear actuator according to claim 18, wherein the vibration damping unit substantially dampens vibrations having a frequency above at least about 100 Hz.

20. The electromechanical linear actuator according to claim 17, wherein the vibration damping unit effectively transmits vibrations having a frequency below at least about 50 Hz.

21. The electromechanical linear actuator according to claim 16, wherein the at least one first resilient member is preloaded.

22. The damping unit according to claim 1, wherein the at least one second resilient member has a higher Young's modulus than that of the at least one first resilient member.

23. The assembly according to claim 10, wherein the at least one second resilient member has a higher Young's modulus than that of the at least one first resilient member.

24. The electromechanical linear actuator according to claim 16, wherein the at least one second resilient member has a higher Young's modulus than that of the at least one first resilient member.

25. The damping unit according to claim 1, wherein the at least one second resilient member is disposed between the bottom surfaces of the lateral projections and the lateral mounting supports.

26. The damping unit according to claim 1, wherein the lateral projections include a first pair of lateral projections on one of the lateral plate surfaces and a second pair of lateral projections on another of the lateral surfaces opposite the lateral plate surface having the first pair of lateral projections;
wherein the mounting supports include a first and a second mounting support, wherein each of the first and second mounting supports have a pair of closed-bottom openings;
wherein the at least one second resilient member is at least two second resilient members; and
wherein the first pair of lateral projections are received in the pair of closed-bottom opening of the first mounting support and at least one of the at least two second resilient members is disposed between the first pair of lateral projections and the pair of closed-bottom openings of the first mounting support; and
wherein the second pair of lateral projections are received in the pair of closed-bottom opening of the second mounting support and at least another one of the at least two second resilient members is disposed between the second pair of lateral projections and the pair of closed-bottom openings of the second mounting support.

27. The damping unit according to claim 1, wherein a dimension of the plate in at least one of the first and second directions is greater than a dimension of the plate in the direction substantially perpendicular to the top surface of the plate.

28. The assembly according to claim 10, wherein a dimension of the plate in at least one of the at least two different directions is greater than a dimension of the plate in the direction substantially perpendicular to the major surface of the plate.

* * * * *